United States Patent [19]

Aries et al.

[11] 3,814,061

[45] June 4, 1974

[54] DEVICE FOR SECURING A VAPORIZABLE ACTIVE SUBSTANCE TO AN ANIMAL COLLAR

[75] Inventors: Robert Aries, Paris; Armand Dechaumet, Mont-de-Marsan; Paul Dupre, Gagny, all of France

[73] Assignee: Dynachim (Societe a responsabilite limitee), Paris, France

[22] Filed: Feb. 8, 1972

[21] Appl. No.: 224,506

[30] Foreign Application Priority Data
Feb. 8, 1971 France.......................... 7104112
Feb. 8, 1971 France.......................... 7104136
Apr. 1, 1971 France.......................... 7111500

[52] U.S. Cl............................................... 119/106
[51] Int. Cl............................................ A01k 27/00
[58] Field of Search ........... 119/106, 156, 157, 160, 119/97; 239/34–36, 52–57, 60

[56] References Cited
UNITED STATES PATENTS

| | | | |
|---|---|---|---|
| 1,127,249 | 2/1915 | Hughes | 119/106 |
| 2,205,711 | 6/1940 | Banks | 119/156 X |
| 2,349,713 | 5/1944 | Finch | 119/106 |
| 2,401,253 | 5/1946 | Lamb, Jr. | 119/106 |
| 2,738,225 | 3/1956 | Meck | 239/55 |
| 2,791,202 | 5/1957 | Doyle | 119/106 |
| 3,477,409 | 11/1969 | Costanzo | 119/106 |
| 3,687,114 | 8/1972 | Berkstresser | 119/106 |

Primary Examiner—Robert Peshock
Assistant Examiner—J. A. Oliff
Attorney, Agent, or Firm—Toren & McGeady

[57] ABSTRACT

A device for securing a vaporizable active substance, such as an insecticide, deodorant, and the like to an animal collar so that the vapors are directed away from the skin of the animal. The device includes a container for the active substance in the shape of a tubular member, envelope or sheath formed of a flexible material or of a hollow medallion. Openings are provided in the container so that they direct the vaporized active substance outwardly away from the animal's skin. Attachment members are secured to the container for fixing it to the animal collar. Alternatively, an adhesive strip can be formed on the inner surface of the container for attaching it to the animal collar.

8 Claims, 9 Drawing Figures

PATENTED JUN 4 1974　　　　　　　3,814,061

DEVICE FOR SECURING A VAPORIZABLE ACTIVE SUBSTANCE TO AN ANIMAL COLLAR

The present invention relates to a device intended to be fixed around the neck of a domestic animal, particularly a dog or a cat, in order to make use of active, self-evaporating chemical substances, such as volatile insecticides which destroy parasites.

The invention relates more particularly to devices using an active product with a vapour pressure of between 0.002 and 0.08 mm Hg at 20°C and more particularly constituted by a composition containing dimethyl dichlorovinyl phosphate or dichlorvos or D D.V.P. on a suitable carrier, which may be accompanied by another insecticide, particularly for increasing the efficiency against ticks.

Collars are already known which are intended to be placed directly on the neck of a domestic animal as a second collar and formed of a plastic material such as polyvinyl chloride, incorporating in the plasticizer state the active product constituted by the dichlorvos, at a percentage of about 10 % for dogs and about 5 % for cats. These protective bands have the disadvantage of placing the active product, which evaporates and exudes through the plastic, in direct contact with the animal's skin and fur.

Insecticidal collars have also been proposed for domestic animals constituted by commercial insecticidal products contained in a sheath perforated on both sides, but these bands or plaquettes, which are prepared so as to be diffused at a given temperature, evaporate differently when they are brought to the temperature of the animal or the perforated sheath.

Containers have also been proposed which are to be suspended from the neck of the domestic animal. These are similar to the containers for air deodorising plaquettes and blocks, but they are of special and very complex construction.

Finally, these means do not make it possible to produce carriers for diffusion which are adapted selectively to each size and breed of animal, nor to its temperature.

The invention aims at remedying the above-mentioned disadvantages and to this end proposes a means enabling on the one hand the same active product to be used at the same concentration for dogs, cats and other animals of different breeds, and on the other hand conventional commercial compositions on fibrous, adsorbent or polymeric carriers to be used, intended in particular for diffusing into the atmosphere active, self-evaporating vapours, and containing about 20 % D.D.V.P. rather than 5 % and 10 % in the known cat and dog band.

The device according to the invention is characterised in that it comprises a container provided with holes, openings, or perforations in its surface and containing a carrier capable of diffusing active vapours at the ambient temperature, with insecticidal, pesticidal or deodorant activity, said openings not being in contact with the animal's fur nor skin.

Thus, the temperature at which the active product isolated from the animal's body evaporates, remains substantially that of the ambient atmosphere. Therefore, for the dichlorvos, the anti-flea efficiency is taken in comparison with bands or collars in direct contact, from 90 days to 120 days, and the efficiency against ticks from 8 weeks to 10 weeks. By the addition of 5 % of the weight of D.D.V.P. of pyridyl phosphates, the efficiency against ticks is increased to 12 weeks. The Applicant has found that 0,0 diethyl 3, 5, 6 trichloro 2 pyridyl phosphoro-thioate may act in this way, but is preferably using 0,0 dimethyl 3, 5, 6 trichloro 2 pyridyl phosphoroate because of its lower toxicity.

The invention makes it possible to standardize both the manufacture and storing and commercialisation of a uniform product with multiple applications. It is advantageous for the user to have, for example, a provision of products with a single base having the same content of insecticide, enabling him to load, as desired, the apparatus for diffusion in the air or the insecticidal carriers according to the invention intended to protect animals against ectoparasites. Moreover, the invention makes it possible to use plaquettes or carriers of insecticidal products intended for domestic use or for diffusion in the air. These latter are inserted directly in the sheath of the case of the device of the invention or are previously placed in a sachet or membrane that is permeable to the insecticidal vapours.

According to one embodiment of the invention, the container is constituted by the animal's actual collar. A collar is therefore produced which is safe for the animal's owners and which has no secondary adverse effect for the animal itself, ensuring an effective defence and protective activity against parasites and finally being able to act as conventional collar for guiding purposes or for holding the animal, for example in association with a lead. Certain of these advantages also apply to deodorising collars, particularly for certain animals.

The collar may be constituted of a unitary element in the form of a sheath, made of flexible material and suitable for encircling the animal's neck, associated with means joining the two ends, the sheath comprising perforations except in the part which touches the animal's fur, and containing a solid carrier for diffusing antiparasitic vapours.

The perforations or gaps may also be disposed towards the lateral zones with respect to the longitudinal axis of the sheath, the lower and upper faces of the sheath having a continuous structure, but the most utilitarian collar has round holes solely towards the outside and towards the centre.

The invention further relates to an envelope or flexible plaquette that may be used as a collar and constituted of two walls made of flexible material connected by their edges and containing a carrier for diffusing active vapours. One of its walls, obligatorily the upper wall, is provided with perforations permitting the passage of the vapours. The opposite wall, or lower wall, is provided with an adhesive coating or catch. The plaquette is enveloped in a removable protective sheet which is detachable when put to use, and ensuring against premature loss by evaporation. In the case of a collar in one size only, part of the sheath not filled with insecticide may be cut off by the user.

It is understood that the quantity of active product to be introduced in the collar according to the invention must preferably vary with the size and features of the animal; by way of indication, the collar for a dog will be provided with a quantity of D.D.V.P. of between 0.5 and 4 g; the collar for a cat will have between 0.5 and 1.0 g of D.D.V.P.; the collar intended for a horse will contain between 5 and 30 g of D.D.V.P. and for sheep between 3 and 8 g.

In another embodiment of the invention, the container is provided with means which enable it to be removably joined to a support member carried by an animal such as a normal dog collar, the container being obligatorily provided with openings of such dimensions and number that the speed of diffusion of the active product is adapted to the size or weight of the animal carrying it, and to the ambient temperature of the container.

The Applicant has noted that the sheets or plates containing D.D.V.P. placed in position in the device according to the invention may advantageously be immersed in a non-aqueous solution of a stabilizing agent, such as a pyridinic compound or a compound having a double bond. It may give a very desirable colouring and contributes to an increased stability to the dichlorvos. Other relatively non-volatile, organophosphorous insecticides, particularly pyridyl phosphates, may be added, as well as other volatile insecticides such as S - acetonitril carbonates. Additives, particularly for assisting the evaporation of the active products, and particularly those containing trivalent nitrogen, may be used.

For the purpose of the invention, the known insecticidal plaquettes may be used, which are constituted by a PVC carrier container D.D.V.P. in plasticizer state, or plaquettes with D.D.V.P. constituted of fibre-reinforced polyester, or a plaquette of D.D.V.P. with absorbants based on inorganic products such as ceramics, or organic products such as cellulose or lignocellulose or a textile wick. The absorbent carrier must have a dense and compact surface.

The invention may also be applied to those compositions containing as the active product dimethyl trichloropyridyl phosphate or other active organic products which evaporate at ambient temperature and which have a vapour tension at 20 °C of between 0.002 and 0.08 mm Hg.

In an embodiment of the invention, the container is constituted of a hollow section made of plastics material insoluble in dimethyldichlorovinylphosphate and not or only very slightly solvent thereof; said section being closed at its ends and having apertures on the outside over its length and distributed over half, at a maximum, of its circumference. There may be just one length, or lengths between 12 and 66 centimetres, the insecticidal composition is contained in said hollow section and constituted by a solution in solid form containing about 20 % or less of dimethyldichlorovinylphosphate of D.D.V.P. and about 18 % of plasticizers and solvents in the macro-molecular mass, said composition being in the form of a continuous or fragmented strip with a total weight of between 3 and 20 g, and provided with a fastening system enabling the container to be attached to the animal's neck. The small cat's medallion may contain only a grain of solid D.D.V.P. insecticide. The composition used is that of insecticidal strips at present on sale, whose composition is as follows:

| | |
|---|---|
| technical D.D.V.P. | 15 to 20 % |
| heavy plasticizers and solvents | 16 to 20 % |
| pigments and stabilizing agents | 0.5 to 2 % |
| polyvinyl chloride | about 60 % |

The strip placed in the hollow section is obtained by cutting out said plaquettes ; its thickness is that of the plaquettes, about 6 mm or are cut in half; its width is between 2 to 10 mm and preferably 3 mm. The length of the inside strip, in one or more pieces, adapted to the hollow section of the collar, is between 5 and 55 centimetres.

The dimensions of the strip are selected as a function of the animal to be protected for example, for a cat, a strip is used which is 2 to 4 mm wide and 5 to 15 cm long; for dogs, one or more strips of 3 to 8 mm width with a length of 10 to 55 cm are used, according to the size of the dog.

The apertures preferably represent together a total open surface such that the ratio thereof, expressed in $cm^2$, with respect to the weight of insecticidal composition, expressed in grams, is between 0.5 and 1.

The Applicant has found that the apertures for the evaporation of the active matter must preferably be round and must be between 5 % and 50 % of the surface of the sheath which is not in contact with the animal's skin or fur. This permits an evaporation at ambient temperature for 120 days compared with 45 days if a plaquette with 20 of D.D.V.P. is used and 85 days if a plaquette of about 10 % (for the dog) and 5 % (for the cat) is used, these latter being a protective strip with a direct contact with the body of the animal.

In another embodiment of the invention, the container is in the form of a medallion and is constituted by a flat case made of plastics material that is insoluble or only slightly soluble in dimethyldichlorovinylphosphate, said case having apertures distributed over one or two of its flat surfaces, but not on the lower side of the pendant. An insecticidal composition is contained in said case and is constituted by a solid solution containing about 20 % or less of dimethyldichlorovinylphosphate or D.D.V.P. and about 20 % plasticizers and solvents in a polymeric or absorbent mass, said composition being in the form of a plate with a thickness of about 3 to 6 mm and a total weight of between 2 and 10 grams, and a fastening device in the form of an S, snap-hook or key-holder, which enables the container to be attached. These pendants can be of any shape or design, but must obligatorily have between 5 % and 75 % of their surface in the form of apertures, which may be on all sides, except the lower side, thus enabling the active product to evaporate at ambient temperature.

The composition used is that of the insecticidal plaquettes currently sold and mentioned hereinabove. In the case of the absorbent carriers, these latter may be impregnated after the medallion has been manufactured.

The weight of the plate is selected as a function of the animal to be protected; for example, for a cat, it will be from 1 to 4 grams; for dogs, it will be from 3 to 10 grams, according to the size of the dog.

The apertures preferably represent together a total open surface such that the ratio of said latter, expressed in $cm^2$, with respect to the weight of insecticidal composition, expressed in grams, is between 1 and 2.

A composition of 120 days' efficiency which may be used for dog collars, as well as dog medallions having an action not only against fleas but also against ticks, is as follows, in percentages:

technical D.D.V.P. on a cellulosic, lignocellulosic, textile carrier or absorbent carrier, in general: 15 % to 25% technical D.D.V.P. on ceramic carrier: 10% to 15%

Dursban or other pyridyl phosphate: 2.5 to 10% of the weight of the D.D.V.P.

Diethyl phthalate or other hydrophobant: 33% to 50% of the weight of the D.D.V.P.

Diphenyl oxide or other co-evaporant: 5% to 25% of the weight of the D.D.V.P.

Stabilisers and dyes: 1 to 5% of the weight of the D.D.V.P.

Anhydrous absorbent product serving as carrier 40% to 60% of liquid components.

This composition is dry and is easy to use. The carrier may be impregnated before or after the perforated sheath has been manufactured. Of course, it must be packed in an outside packaging which is impermeable to the active products.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

Figure 1:
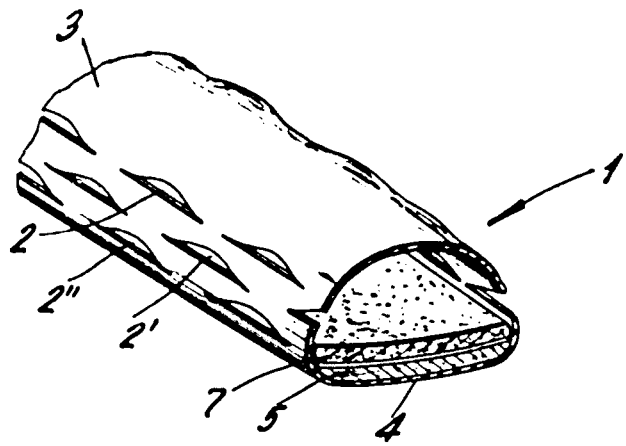
FIG. 1 is a perspective view, partly in section; of a portion of a device intended to be worn around the neck of the domestic animal and incorporating one embodiment of the present invention.

In FIG. 1 a portion of a collar is shown intended to be worn around the neck of a domestic animal, such as a cat or dog. The collar consists of a flexible tubular element in the form of a tubular sheath or container 1 having an outer surface 3 and an inner surface 4, the inner surface arranged to be located adjacent the animal's fur and the outer surface arranged to be directed outwardly from the animal's fur. In the side surfaces of the tubular container 1, that is the surfaces extending between the inner and outer surfaces, a plurality of gaps or openings 2, 2', 2'', are provided. The openings or gaps 2,2',2'' are perforated in the surface of the tubular container 1 and are kept open by permanent deformation or by a transverse tension on the flexible material forming the tubular container.

Figure 2:
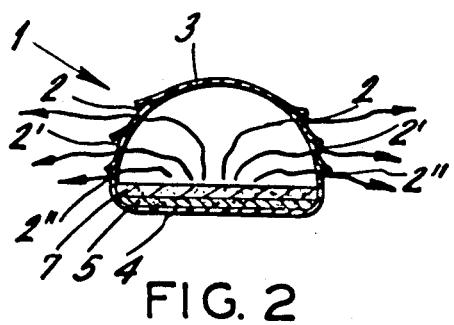
FIG. 2 is a transverse cross-sectional view of the device shown in FIG. 1.

As can be seen in FIG. 2, the outer surface 3 of the tubular container 1 does not contain the gaps or openings and presents a smooth surface which prevents the animal from becoming caught. Further, the lateral arrangement of the gaps or openings 2, 2',2'' has the effect of directing the vapors from within the tubular container away from the animal.

The inner surface 4 of the tubular container 1 is a continuous structure and does not have any openings. The inner surface rests directly on the body or fur of the animal and protects it from the active products contained within the tubular container.

Disposed within the tubular container is a rigid support 5 for a solid carrier for diffusing active vapors of insecticidal, antiparasitic or deodorizing action through the gaps 2, 2',2'' in the sides of the container. Further, a carrying element 7 for the solid carrier is provided within the tubular container and is made of a material which does not or only partly reacts with the active product in the solid carrier.

Figure 3:
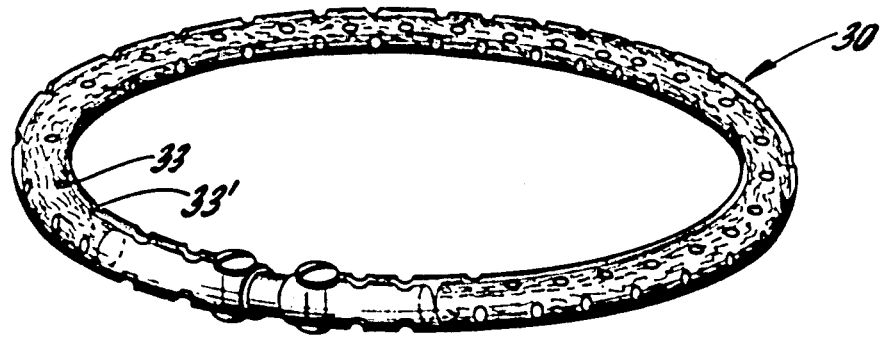
FIG. 3 is a perspective view of the device shown in FIGS. 1 and 2 incorporated into a collar for a domestic animal.

In FIG. 3, a collar for an animal is shown which is formed of a tubular section of plastic material 30 containing perforations 33,33' distributed regularly in its surface. Within the tubular member a porous structure is located which is impregnated with an active agent which evaporates and diffuses in the immediate environment of the animal through the perforations or openings 33,33' formed in its surface. As with the device shown in FIGS. 1 and 2, the tubular member in FIG. 3 is formed of a flexible material, suitable for encircling an animal's neck. The openings through the tubular member are arranged so that the vapors from within the tubular member do not come in direct contact with the animal's skin. The opposite ends of the tubular member are enclosed by means for joining the ends together in the form of a collar or band.

Figure 4:
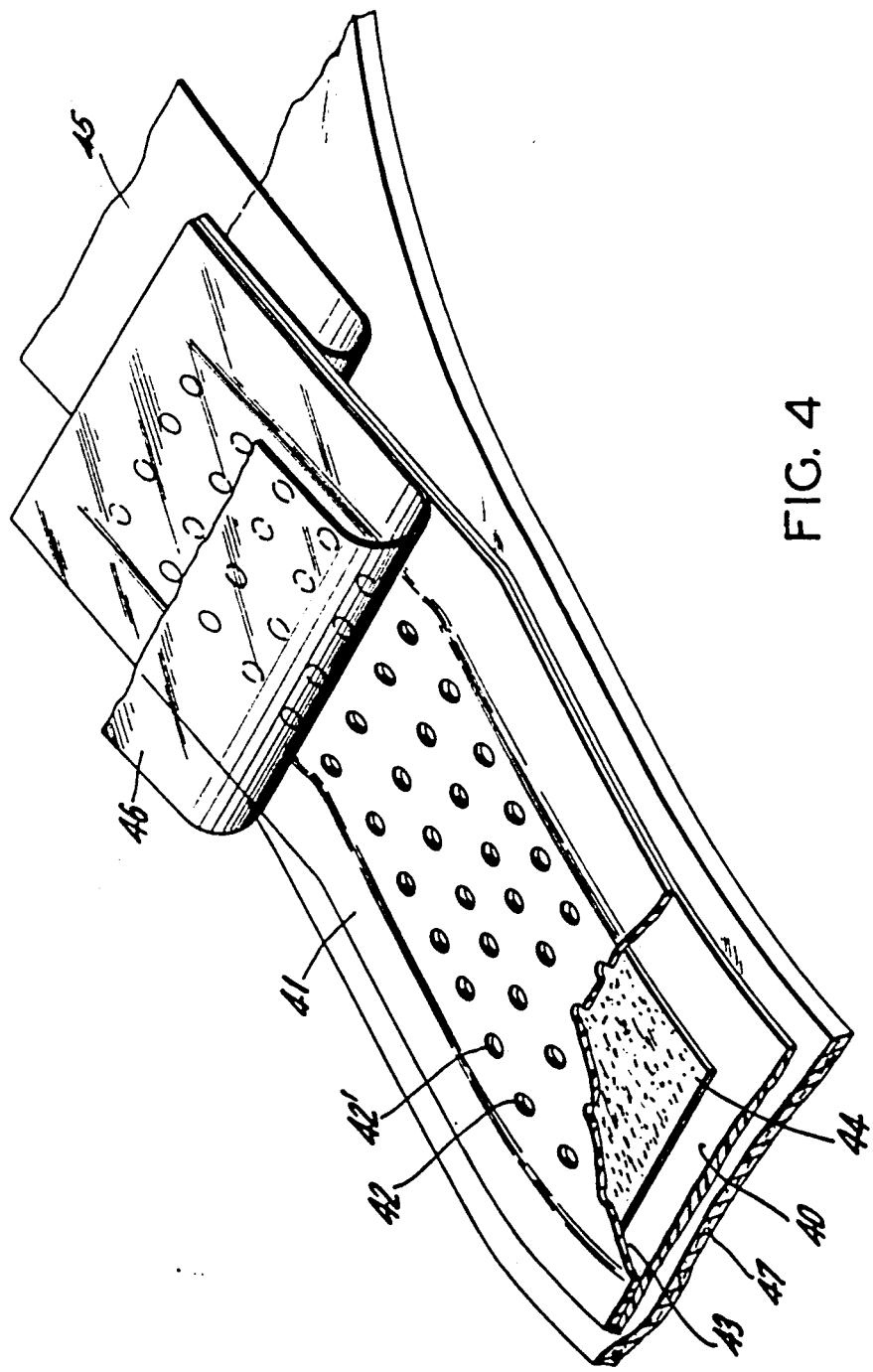
FIG. 4 is an exploded partial view, illustrated in perspective, of an envelope forming another embodiment of the device set forth in FIG. 1.

In FIG. 4, an envelope made of flexible material contains a solid carrier element 44 for diffusing an active vapor. The envelope consists of an inner wall 40 and an outer wall 41. The inner wall is of an imperforate structure while the outer wall 41 has a plurality of perforations 42, 42'. The envelope formed on the container provides an interior volume 43 within which the solid carrier element 44 is positioned. The outer surface of the inner wall 40 has a self-adhesive coating or catch for detachably joining the envelope, formed as a container, to a collar 47 for an animal. Each of the outer surfaces of the inner wall 40 and the outer wall 41 has a removable protective sheet 45, 46, respectively, which are removable when the container is placed in use. When the container is not in use the protective sheet on the outer wall provides a covering over the perforations 42, 42' so that no vapor diffuses from them and the removable sheet on the inner wall protects the self-adhesive coating which attaches the container to the collar of an animal.

Figure 5:
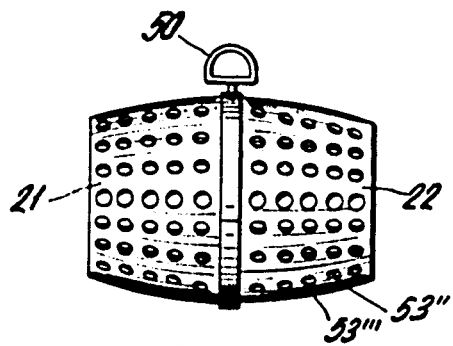
FIG. 5 is a side view of another embodiment of the device of FIG. 1.
Figure 6:
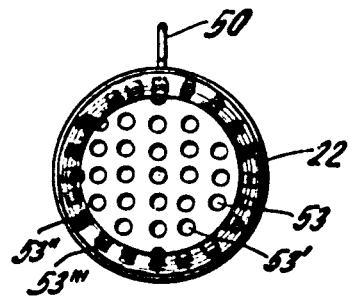
FIG. 6 is an end view of the arrangement shown in FIG. 5.

In FIGS. 5 and 6, a container for the active agent or carrier element is provided by a hollow medallion composed of two parts 21,22 with a plurality of orifices or openings 53,53', 53'' and 53''', formed through the surfaces of the two parts. Further, a ring 50 is secured to the medallion for fastening it to an animal's collar.

Figure 7:
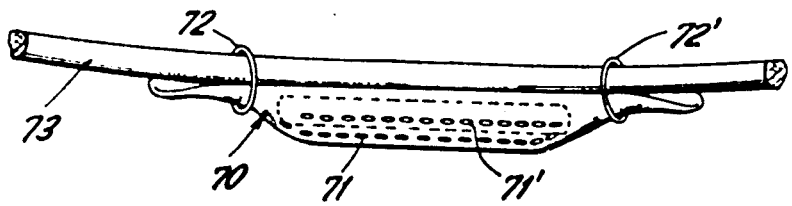
FIG. 7 is a perspective view of another embodiment of the present invention.

In FIG. 7, a sheath 70 formed of plastic material is provided with apertures 71, 71', on the surface of the sheath directed outwardly from the collar 73. The ends of the sheath 70 are secured to the collar 73 by sliding the rings 72, 72' along the ends of the sheath until they tightly affix the sheaths to the collar and prevent it from displacement. The sheath 70 is flattened at its end and is extended at it mid-portion which contains a composition for diffusing vapors of an active product which evaporates at ambient temperatures.

Figure 8:
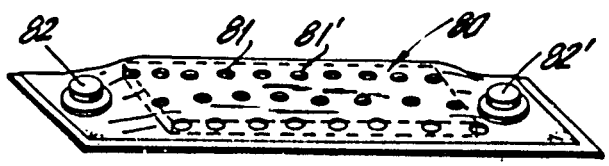
FIG. 8 is a perspective view of still another embodiment of the present invention.

In FIG. 8, the container is provided by an elongated hollow strip or sheath 80 containing openings 81, 81' in one of its surfaces for diffusing vapors of an active product located within the sheath which evaporates at ambient temperatures. The sheath 80 is closed at its ends and each end has a pressed stud 82,82' for use in securing the sheath 80 on an animal's collar by engaging the pressed studs 82,82' in corresponding studs affixed to the collar.

The sheaths 70,80 shown in FIGS. 7 and 8 are intended to be secured to the exterior surface of the collar so that the openings are directed outwardly away from an animal's skin.

Figure 9:
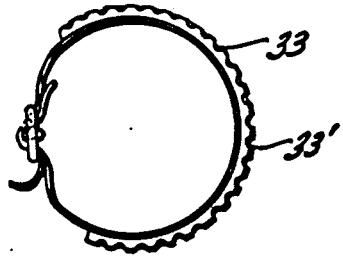
FIG. 9 is an end view of another arrangement of the device shown in FIG. 3.

In FIG. 9, the container or sheath holding the active product which diffuses vapor is secured to an animal's collar so that its openings are directed outwardly away from the collar, that is, away from the skin of the animal. The ends of the collar are secured together by a buckle or similar member.

As can be seen in the various collar constructions, the openings for the vapor are directed outwardly away from the skin of the animal.

In the various embodiments shown the active ingredient is covered by a sheath or similar container having openings through which the active substance can evaporate.

The various embodiments of the present invention are such as to permit rapid production of the container or sheaths incorporating the active substance.

While a specific embodiment of the invention has been shown and described in detail to illustrate the application of the inventive principles, it will be understood that the invention may be embodied otherwise without departing from such principles.

We claim:

1. Device intended to be carried around the neck of a domestic animal, comprising a collar capable of being fitted around the neck of the animal, said collar including a container, said container comprising a sheath formed of a flexible plastic material forming a closed hollow space elongated in the longitudinal direction of said collar and extending for at least a major portion of the length of the collar and said sheath having a first surface directed toward the body of the animal and a second surface directed outwardly away from the body of the animal, said first surface is imperforate and said second surface is perforate and opens into the hollow space formed by said sheath, a solid carrier located within said hollow space and an active substance incorporated into said solid carrier, said solid carrier is formed of an absorbent material and consists of a plurality of particles, said particles having a dimension of between 2 and 6 mm, and said active substance comprising dimethyl-dichlorovinyl phosphate at concentrations of more than 10% of D.D.V.P. and in quantities of between 0.25 g and 3.5 g with said active substance being vaporizable at ambient temperature and having a vapor pressure in the range of 0.002 to 0.10Hg at 20°C.

2. Device intended to be carried around the neck of a domestic animal, comprising a collar capable of being fitted around the neck of the animal, said collar including a container, said container comprising a sheath formed of a flexible plastic material forming a closed hollow space elongated in the longitudinal direction of said collar and extending for at least a major portion of the length of the collar and said sheath having a first surface directed toward the body of the animal and a second surface directed outwardly away from the body of the animal, said first surface is imperforate and said second surface is perforate and opens into the hollow space formed by said sheath, a solid carrier located within said hollow space and an active substance incorporated into said solid carrier, the plastic material forming said sheath is insoluble in dimethyl-dichlorovinyl phosphate and is at most very slightly solvent thereof, said sheath section having a length in the longitudinal direction of said collar in the range of 5 to 60 cm, said active substance comprises a solid solution containing about 20% of dimethyldichlorovinyl phosphate and about 20% of plasticizers and solvents, said active substance being vaporizable at ambient temperature and having a vapor pressure in the range of 0.002 to 0.10 hg at 20°C, and said solid carrier being in strip form and having a total weight of between 3 and 25 g and a total length of between 5 and 58 cm.

3. Device, as set forth in claim 2, wherein said sheath of said container has the form of an envelope detachably connected to said collar, said first surface of said sheath has a self-adhesive coating for detachably joining it to said collar, and a removable protective sheet located on each of said first and second surfaces of said sheath before its attachment to said collar with said sheet on the first surface protecting the self-adhesive coating and said sheet on said second surface closing the perforations therein to prevent the evaporation of the active substance within the hollow space in said container.

4. Device, as set forth in claim 2, wherein said sheath is a separate member from said collar, the opposite ends of said sheath in its elongated direction being flattened with the hollow space formed by said sheath extending between said flattened ends, and a pair of loops movably positionable on said collar and each arranged for securing one of said flattened ends of said sheath to said collar for fixing said sheath on said collar.

5. Device, as set forth in claim 2, wherein said sheath having press studs formed on the closed end portions of said sheath, and said press studs arranged to be secured to corresponding studs on said collar.

6. Device, as set forth in claim 2, wherein the perforations in the second surface of said sheath form between 5 and 60% of said second surface.

7. Device, as set forth in claim 6, wherein said perforations in the second surface of said sheath form 17% of the second surface.

8. Device, as set forth in claim 2, wherein said active substance in said carrier is enclosed within a permeable member within the hollow space in said sheath for ensuring a supplementary isolation of the active substance and a better control of its evaporation.

* * * * *